US010943181B2

(12) United States Patent
Shteingart et al.

(10) Patent No.: US 10,943,181 B2
(45) Date of Patent: Mar. 9, 2021

(54) JUST IN TIME CLASSIFIER TRAINING

(71) Applicant: Microsoft Technology Licensing, LLC, Redmond, WA (US)

(72) Inventors: Hanan Shteingart, Herzliya (IL); Yair Tor, Redmond, WA (US); Eli Koreh, Tel Aviv (IL); Amit Hilbuch, Kfar Saba (IL); Yifat Schacter, Tel Aviv (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 1241 days.

(21) Appl. No.: 14/751,135

(22) Filed: Jun. 26, 2015

(65) Prior Publication Data

US 2016/0379135 A1    Dec. 29, 2016

(51) Int. Cl.
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS

| | | | |
|---|---|---|---|
| 6,789,070 | B1 | 9/2004 | Willett et al. |
| 7,587,374 | B1 | 9/2009 | Lynch et al. |
| 8,706,668 | B2 | 4/2014 | Melvin et al. |
| 2006/0184475 | A1 | 8/2006 | Krishnan et al. |
| 2008/0103996 | A1 | 5/2008 | Forman et al. |
| 2011/0302118 | A1* | 12/2011 | Melvin ................. G06N 20/00 706/21 |
| 2013/0013539 | A1 | 1/2013 | Chenthamarakshan et al. |
| 2013/0198119 | A1 | 8/2013 | Eberhardt et al. |
| 2013/0325762 | A1 | 12/2013 | Raileanu et al. |
| 2013/0332401 | A1 | 12/2013 | Muraoka et al. |
| 2014/0187177 | A1* | 7/2014 | Sridhara ............. H04B 17/391 455/73 |
| 2014/0236874 | A1 | 8/2014 | Abell et al. |

FOREIGN PATENT DOCUMENTS

| | | |
|---|---|---|
| CN | 103593352 A | 2/2014 |
| CN | 103914686 A | 7/2014 |

OTHER PUBLICATIONS

Krause, Stefan, and Robi Polikar. "An ensemble of classifiers approach for the missing feature problem." Int. Joint Conf on Neural Networks. vol. 1. 2003.*

(Continued)

*Primary Examiner* — Daniel T Pellett
(74) *Attorney, Agent, or Firm* — Alleman Hall Creasman & Tuttle LLP

(57) ABSTRACT

Disclosed herein is a system and method that can be used with any underlying classification technique. The method receives a test dataset and determines the features in that test dataset that are present. From these features the training dataset is modified to only have those features that are present in the test dataset. This modified test dataset is then used to calibrate the classifier for the particular incoming data set. The process repeats itself for each different incoming dataset providing a just in time calibration of the classifier.

19 Claims, 5 Drawing Sheets

(56) References Cited

OTHER PUBLICATIONS

Saar-Tsechansky, Maytal, and Foster Provost. "Handling missing values when applying classification models." Journal of machine learning research Jul. 8, 2007: 1623-1657.*

Kalkan, Habil. "Online feature selection and classification with incomplete data." Turkish Journal of Electrical Engineering & Computer Sciences 22.6 (2014): 1625-1636.*

García-Laencina, Pedro J., José-Luis Sancho-Gómez, and Aníbal R. Figueiras-Vidal. "Pattern classification with missing data: a review." Neural Computing and Applications 19.2 (2010): 263-282.*

García-Laencina, Pedro J., J. Sancho-Gomez, and Aníbal R. Figueiras-Vidal. "Pattern classification with missing values using multitask learning." Neural Networks, 2006. IJCNN'06. International Joint Conference on. IEEE, 2006.*

IPEA European Patent Office, Second Written Opinion Issued in PCT Application No. PCT/US2016/039132, dated May 29, 2017, WIPO, 8 Pages.

"AI", Retrieved on: Dec. 10, 2014 Available at: http://yz.mit.edu/notes/AI.

Dekel, et al., "Learning to classify with missing and corrupted features",In Proceedings of the 25th International Conference on Machine Learning, Jul. 5, 2008, 8 pages.

Alippi, et al., "Just-in-Time Classifiers for Recurrent Concepts", In Proceedings of IEEE Transactions on Neural Networks and Learning Systems, vol. 24, Issue 4, Feb. 1, 2013, 15 pages.

Krause, et al., "An ensemble of classifiers approach for the missing feature problem", In Proceedings of the International Joint Conference on Neural Networks, vol. 1, Jul. 20, 2003, 6 pages.

Acuna, et al., "The treatment of missing values and its effect in the classifier accuracy", In Proceedings of the Meeting of the International Federation of Classification Societies, Jul. 15, 2004, 9 pages.

Schuurmans, D. et al., "Learning to Classify Incomplete Examples", In Computational Learning Theory and Natural Learning Systems IV: Making Learning Systems Practical, Jan. 1, 1997, 14 pages.

García-Laencina, P. et al., "Pattern Classification with Missing Values using Multitask Learning", In Proceedings of the 2006 International Joint Conference on Neural Networks, Jul. 16, 2006, Vancouver, British Columbia, 8 pages.

Polikar, R., "Bootstrap—Inspired Techniques in Computational Intelligence", IEEE Signal Processing Magazine, vol. 24, Issue 4, Jul. 1, 2007, 14 pages.

Saar-Tsechansky, M. et al., "Handling Missing Values when Applying Classification Models", In Journal of Machine Learning Research, vol. 8, Jul. 1, 2007, 33 pages.

Kalkan, H., "Online feature selection and classification with incomplete data", In Turkish Journal of Electrical Engineering & Computer Sciences, vol. 22, Issue 6, Published Online Nov. 7, 2014, 12 pages.

ISA European Patent Office, International Search Report and Written Opinion Issued in PCT Application No. PCT/US2016/039132, dated Oct. 7, 2016, WIPO, 13 pages.

"International Preliminary Report on Patentability Issued in PCT Application No. PCT/US2016/039132", dated Sep. 18, 2017, 9 Pages.

* cited by examiner

JUST IN TIME CLASSIFIER TRAINING

BACKGROUND

Classifiers are used in many systems to take a data set and generate one or more conclusions or classifications based on the data set. For example, a data set may be classified as indicating a fraudulent transaction after being passed through a classifier, or medical information can be passed through a classifier that then indicates the probability that a patient has a certain condition. Many of these systems may employ machine learning to tune the classifier. This requires the provisioning of a training set of data that has known results.

However, in many instances the classifier has been trained on data that doesn't match the expected input test data from real sources. Real data often has missing values for features that the classifier was trained on. This can occur because the particular value of the feature was never collected or somehow disappeared during the processing of the data sets. Typical systems deal with the missing values for the features by inserting a value for the missing feature. This is problematic because the inserted value has no real relationship the surrounding data. Sometimes the situation occurs that both the trained and tested data have missing values.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present disclosure presents a system and method that can be used with any underlying classification technique. The method receives a test dataset and determines the features in that test dataset that are present. From these features the training dataset is modified to only have those features that are present in the test dataset. This modified test dataset is then used to calibrate the classifier for the particular incoming data set. The process repeats itself for each different incoming dataset providing a just in time calibration of the classifier.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
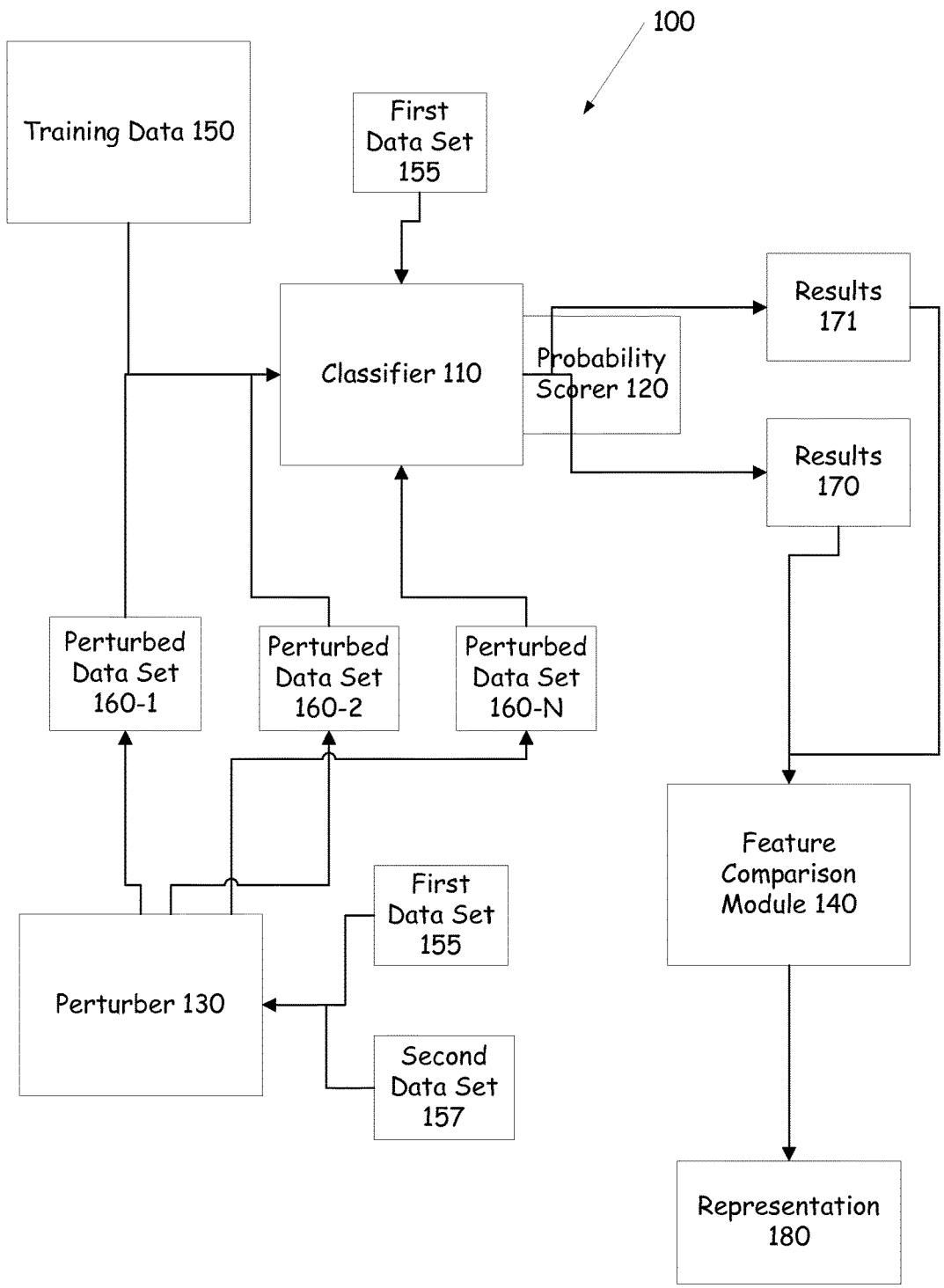
FIG. 1 is a block diagram of a system for determining which features of a data set are the features that determine a particular output of the data when the data is passed through a classifier according to one illustrative embodiment.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. This is distinct from computer storage media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media, but not within computer storage media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

In many machine learning systems in general, and binary classification in particular, there is a need to decipher or understand what the reason is for deciding the output classification is positive (e.g. fraud in cyber security or illness in medicine) rather than negative (e.g. genuine in cyber security or healthy in medicine). For example, in a fraud detection system, the human reviewer might want to know the reason or reasons an automatic fraud detection system labeled a user as fraudulent. One tedious solution is to analyze the classification model and understanding what lead to the observed output. With modern machine learning this analysis becomes challenging and requires specialists. This is especially true when using models which don't assume data feature independence.

The present disclosure presents method which can be used with any underlying classification or regression technique. The method takes into account both the value of the current feature vector. It is based on evaluating the effect of perturbing each feature by bootstrapping it with the negative (opposite) samples and measuring the change in the classifier output. For instance, assume classification of a feature vector of a positively labeled instance. To assess the importance of a given feature value in the classified feature vector, a random negatively labeled instance is taken out of the training set and replaces the feature at question (i.e. the one of the features in the positively labeled feature vector) with a corresponding feature from this set. Then, by classifying the modified feature vector and comparing its predicted label and classifier output (score and label) it is possible to measure and observe the effect of changing each feature. This measure can be used to rank the features by their effect on the observed label and output. Thus, the manual reviewer now can assess the contribution of each feature by its value, rank and effect size in a quick and efficient manner.

FIG. 1 is a block diagram of a system for determining which features of a data set are the features that determine a particular output of the data when the data is passed through a classifier 110. This system may allow for the determination of whether a data set that has missing values can be processed or not. Specifically, if the missing data values or features are determined to be not important or have minimal to no impact on the overall results the data can be processed with high confidence. If the missing data points or features have an impact on the overall results the system can either not process the data or can add values for the data into the data set. The system includes a classifier 110, a scorer 120, a perturber 130, a feature comparison module 140 and a set of training data 150.

The classifier 110 is a component of the system that is configured to classify a data set according to a set of rules. The set of rules that are used by the classifier 110 are designed to look at the data set that is input and each feature of the data set and determine a particular output based on the combination of the features of the data set. For example, the classifier 110 may be configured to determine if a transaction is a fraudulent transaction. In this instance each of the features that appear in the data set provide information to the classifier 110 as to if the transaction is or is not fraudulent. The classifier 110 is trained using training data 150 that has features in the training data 150 that should result in a particular result from the classifier 110. The more training data 150 that is processed through the classifier 110 the more the classifier 110 is able to tune or modify the rules that are used to generate a particular output. The classifier 110 can use any rules or processes available to classify or otherwise produce the output from the input data, such as training data 150, first data set 155 and second data set 157 as input and results 170 and 171 and output.

The output 170/171 of the classifier 110 can simply contain the determined result. That is, for example, in the case of a fraud transaction that the transaction is fraud or is not fraud. However, in some embodiments the output also includes a probability that the determination by the classifier 110 is in fact correct. To obtain the probability the classifier 110 passes the output through a scorer 120. The scorer 120 can be part of the classifier 110 or it may be a separate component of the system. The scorer 120 is configured to calculate the likelihood that the classifier 110 has produced the correct result. Alternatively the scorer 120 is configured to identify the portion of the results that caused the classifier 110 to classify the result in the manner that it did. For example if the classifier 110 merely outputs a score for the classification and that score is compared to a rule for the decision, the scorer 120 can calculate the delta between the determined score and the score needed to cause the decision to be made. The scorer 120 can use any method, process or means for calculating the probability or score.

The perturber 130 is a component of the system that is configured to take one data set (e.g. first data set 155) in the test data and change or modify one of the features that make up that data set with a corresponding feature from another one of the data sets in the test data. Specifically, the perturber 130 identifies a random data set such as second data set 157 in the training data 150 that results in the opposite result from the first data set 155 when pushed through the classifier 110. This second data set 156, because it results in the opposite result as the first data set 155, is known to have features in it that cause this opposite result. The perturber 130 swaps a first feature in the first data set 155 with the corresponding first feature in the second data set 156 to create a perturbed data set 161-1. The perturber 130 repeats this process for each of the features in the first data set 155, to create additional perturbed data sets 161-2, 161-N (all collectively referred to herein as perturbed data set 161). This process can also be repeated several times for the same feature in an attempt to gain better statistics for the feature. In some embodiments the perturber 130 can select multiple features to replace in creating a perturbed data set 161. This approach with regards to multiple data sets can help identify situations where a group of features while individually not important to the overall classifier 110 decision when considered together may have significant or noticeable effects on the output of the classifier 110.

The feature comparison module 140 is a component of the system that is configured to receive the output from the classifier 110 from each of the perturbed data sets 161 and to compare the results 171 of that classification with the results 170 from the original classification of the un-perturbed data set (i.e. first data set 155). For each feature in the data set the feature comparison module 140 computes a deviation statistic for that feature such as mean label or score deviation. This deviation statistic indicates or represents the change caused by the subbing of the particular feature. The results 171 from the classifier 110 may indicate that the particular feature caused the change to be more or less in favor of a particular result. That is the result may be stronger towards the original result for the first data set 155 or move the score closer to the opposite result.

The feature comparison module 140 identifies the feature or features in the perturbed data set that was changed and compares that feature with the original feature of the first data set 155. In this way the feature comparison module 140 can identify the amount of change that occurred when the feature was subbed out. This allows for the system to judge the overall impact of a specific feature change beyond the actual change in the score. If the two features used are actually quite close, then the expectation would be that there would be little to no change in the classification. This closeness can cause a specific feature to be missed, but also allows for a determination if additional analysis may be needed using a different opposite data set. The feature comparison module 140 builds a table of features and the corresponding probabilities received for the perturbed data sets such that the impact of the feature on the results can be observed, reported and displayed as a representation 180. In some approaches the feature comparison module 140 may receive results from the use of multiple different data sets from the training data 150. In this instance the feature scorer can aggregate the effects of each of the features in the overall report or representation 180. By doing this the effects of a particular feature from the negative result is normalized.

The set of training data 150 is a set of data that is used to train the classifier 110. The training data 150 has a number of data sets that are designed to produce a first result and a number of data sets that are designed to produce a second result. Depending on the intent of the classifier 110 there may be more training data 150 data sets that are designed to produce different results. This can occur, for example, in certain types of medical data where certain features can indicate one result, but a slight change in one or more of the features could result in many different conclusions. Each of the data sets in the training data 150 has a number of features that are present in the data set that help cause the data set to cause the classifier 110 to report the particular data set in a particular way. By passing each of the training data 150 sets through the classifier 110 the classifier 110 is able to become calibrated to the specific data results that the user or other organization desires.

Figure 2:
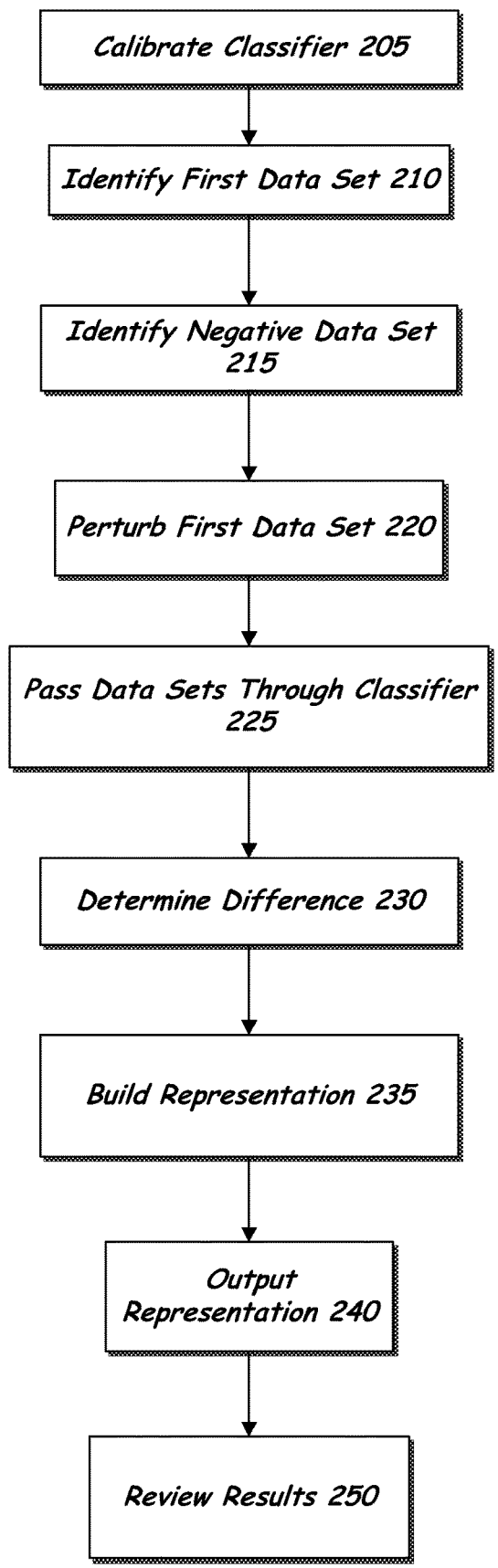
FIG. 2 is a flow diagram of a process of identifying key features in a data set that determine the output of the classifier according to one illustrative embodiment.

FIG. 2 is a flow diagram of a process of identifying key features in a data set that determine the output of the classifier 110 according to one illustrative approach.

The process begins by training the classifier 110. This is illustrated at step 205. At this step in the process the training data 150 is processed through the classifier 110. The classifier 110 reports on the results of each of the training data 150 sets. A user or other system reviews the results from each of the processed data sets and makes adjustments to the rules used by the classifier 110 to cause the classifier 110 to report correctly on each of the inputted data sets. The process to calibrate the classifier 110 can be any training process available.

Once the classifier 110 has been trained the next step is to identify a first data set 155 to analyze. This first data set 155 can be a data set that already exists in the training data 150 or can be a new data set that exists in the world outside of the training data 150. The identification of the first data set 155 is illustrated at step 210. If the first data set 155 has not previously been passed through the classifier 110 the first data set 155 is passed through the classifier 110 at this step as well. This ensures that a baseline result of the first data set 155 has been achieved. This also helps in the later selection of a second data set 156 as the negative result is now known.

Next the process identifies one or more data sets in the training data 150 that produce the negative or opposite result as the first data set 155 when processed through the classifier 110. The negative data set can also be a negative data set that has been previously processed through the classifier 110 and is not part of the training data 150. This is illustrated at step 215. It should be noted that the identification of the negative data set is an optional step as some of the approaches employed by the perturber 130 do not need the negative data set.

Once the negative data set has been identified, the first data set 155 and the negative data set are provided to the perturber 130. The perturber 130 proceeds to modify or perturb the first data set 155 in some manner so that the features that most affect the output from the classifier 110 can be identified. This is illustrated at step 220

In one approach the perturber 130 proceeds to perturb the first data set 155 with features from the negative data set. In this approach the perturber 130 takes a feature from the first data set 155 and replaces it with the corresponding feature from the negative data set. This results in the creation of a perturbed data set whereby all but one of the features in the first data set 155 remain unchanged. The perturber 130 repeats this process for each of the features that are found in the first data set 155 and may also repeat the process for the same feature as well. This results in the creation of a plurality of perturbed data sets. Typically, the number of features dictates the number of perturbed data sets that are created for the first data set 155. However, in some instances the negative data set may not have values for a particular feature or conversely the first data set 155 may be missing that particular feature from its data set. In these case the perturber 130 can either skip the missing feature or can remove the feature (or add in) to the perturbed data set. In another approach that is similar to the replacement of a single feature the perturber 130 can replace two or more features at the same time. This can be useful in situations where a number of features have been determined or are found to already be related or part of a group. Or it may occur in instances where taken individually it is known that the feature is not important but when tied with other features it has some impact. These families of features may be found for example, by testing the effect of the removal or substitution of the members of the family together versus the independent removal or substitution of each feature.

In yet another approach the perturber 130 modifies the first data set 155 without the need for the negative data set. In this approach the perturber 130 uses a recursive approach to find the features that are the most influential on the classification by the classifier 110. The perturber 130 removes the feature from the first data set 155 to create the perturbed data set. This process is repeated for each of the features in the first data set 155 thereby creating the set of perturbed data sets. In removing the feature the perturber 130 can simply cause the feature to have a zero value or it can remove it completely from the data set as if the feature was never there. In yet another approach that does not require a negative data set the perturber 130 goes through each of the features of the data set and removes all but one of the features to create the first perturbed data set. The perturber 130 then proceeds to add one additional feature to the perturbed data set in creating additional perturbed data sets. This process can be repeated in some approaches using a different feature as the starting feature.

The perturber 130 can, in some approaches, use pair-wise correlation of features. In this approach the perturber 130 replaces features values based on the remaining feature values. That is the perturber 130 acts by regressing the value of the particular feature to be used according to the value of the other features form the negative data set. In this approach, the feature is replaced with a conditional distribution given the other features rather a marginal one.

Regardless of which approach is used by the perturber 130 to generate a set of perturbed data sets for the first data set 155, each of the perturbed data sets is passed through the classifier 110. This is illustrated at step 225. The classifier 110 takes each of the perturbed data sets and determines the corresponding output for each of the perturbed data sets. The classifier 110 uses the rules and processes that it was calibrated to use earlier and does not alter or change its methodology. This result includes the associated probability score for the data set generated by the scorer 120.

Once the perturbed data has been processed through the classifier 110 the results of each classification are provided to the feature comparison module 140 to determine the difference in the output of the classifier 110 based on the change in particular feature or features. This is illustrated at step 230. Also at this time the feature comparison module 140 receives the original version of the first data set 155 as well as all of the perturbed data sets that were passed through the classifier 110. The feature comparison module 140 identifies the feature or features in the perturbed data set that was changed and compares that feature with the original feature of the first data set 155. In this way the feature comparison module 140 can identify the amount of change that occurred when the feature was subbed out. For each feature in the first data set 155 the feature comparison module 140 computes a deviation statistic for that feature such as mean label or score deviation. Again the identification of the features is based on the perturbed data set and the associated changed feature in the data set. This deviation statistic indicates or represents the change caused by the subbing of the particular feature. The results from the classifier 110 may indicate that the particular feature caused the change to be more or less in favor of a particular result. That is the result may be stronger towards the original result for the first data set 155 or move the score closer to the opposite result.

The feature comparison module 140 builds a table (or other representation) of features and the corresponding probabilities received for the perturbed data sets. This is illustrated at step 235. At this step the feature comparison module 140 builds the representation such that the impact of the feature on the results can be observed, reported and displayed. In some approaches the feature comparison module 140 may receive results from the use of multiple different data sets from the training data 150. In this instance the feature scorer can aggregate the effects of each of the features in the overall representation. By doing this the effects of a particular feature from the negative result is normalized. In some approaches the feature comparison module 140 can highlight those features where the normalization process had the greatest effect. This could be where in some of the data sets that feature had more of an impact than in others, such as where the value associated with the feature was significantly different than the value that was present in the first data set 155.

The representation that was generated by the feature comparison module 140 is output. This is illustrated at step 240. The output could be simply storing the representation in a data storage system for later retrieval. The output could be formatted and displayed to a user on a display device associated with a computing device. In some approaches the representation may be limited to a select number of features to prevent overloading the representation when viewed by a user. The feature comparison module 140 may only store in the representation those features where the difference determined exceeds a particular threshold. Alternatively or in combination the feature comparison module 140 may only include in the representation a certain number of features that exceed the threshold.

At step 250 a user or other administrator can review the representation. They can also make changes to the classifier 110 and/or the data sets based on the information that is contained in the representation. For example, if they are able to identify a subset of features that drive the results and a second subset of the features that do not drive the results the administrator could determine that the second subset of features does not need to be collected or included in the data sets. This can allow for a more efficient process of both collecting the data from the sources of the data and also speeding up the processing as less data is needed by the system to achieve the same or substantially similar results. The user can also see through the representation possible area where minor data manipulation of a feature can cause a different result.

Figure 3:
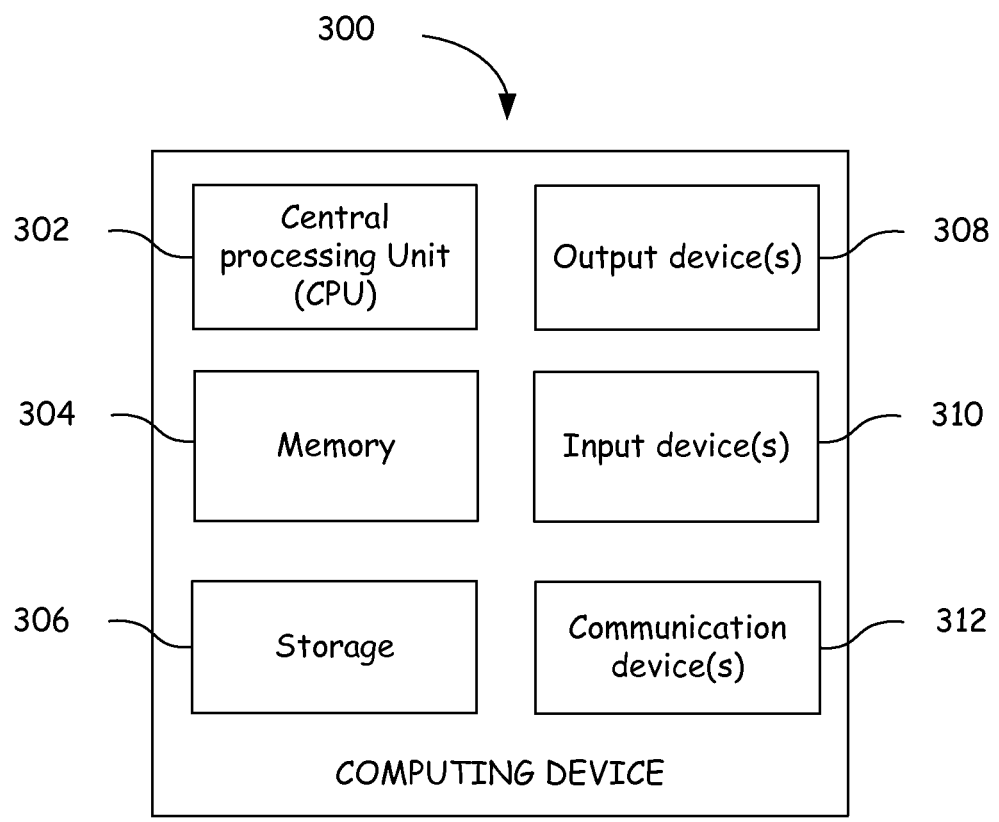
FIG. 3 illustrates a component diagram of a computing device according to one embodiment.

FIG. 3 illustrates a component diagram of a computing device according to one embodiment. The computing device 300 can be utilized to implement one or more computing devices, computer processes, or software modules described herein. In one example, the computing device 300 can be utilized to process calculations, execute instructions, receive and transmit digital signals. In another example, the computing device 300 can be utilized to process calculations, execute instructions, receive and transmit digital signals, receive and transmit search queries, and hypertext, compile computer code, as required by the system of the present embodiments. Further, computing device 300 can be a distributed computing device where components of computing device 300 are located on different computing devices that are connected to each other through network or other forms of connections. Additionally, computing device 300 can be a cloud based computing device.

The computing device 300 can be any general or special purpose computer now known or to become known capable of performing the steps and/or performing the functions described herein, either in software, hardware, firmware, or a combination thereof.

In its most basic configuration, computing device 300 typically includes at least one central processing unit (CPU) 302 and memory 304. Depending on the exact configuration and type of computing device, memory 304 may be volatile (such as RAM), non-volatile (such as ROM, flash memory, etc.) or some combination of the two. Additionally, computing device 300 may also have additional features/functionality. For example, computing device 300 may include multiple CPU's. The described methods may be executed in any manner by any processing unit in computing device 300. For example, the described process may be executed by both multiple CPU's in parallel.

Computing device 300 may also include additional storage (removable and/or non-removable) including, but not limited to, magnetic or optical disks or tape. Such additional storage is illustrated in FIG. 3 by storage 306. Computer storage media includes volatile and nonvolatile, removable and non-removable media implemented in any method or technology for storage of information such as computer readable instructions, data structures, program modules or other data. Memory 304 and storage 306 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 300. Any such computer storage media may be part of computing device 300.

Computing device 300 may also contain communications device(s) 312 that allow the device to communicate with other devices. Communications device(s) 312 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 300 may also have input device(s) 310 such as keyboard, mouse, pen, voice input device, touch input device, etc. Output device(s) 308 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The classifier is in one approach trained or calibrated using a just in time calibration method. In order for a classifier to be useful on a particular dataset it needs to be calibrated for that particular set of data. This can result in a large number of classifiers needing to be calibrated to handle the large number of different dataset types that can be passed through the classifier. Also many times the data that is to be processed through the classifier doesn't match the particular dataset exactly that was used to train to classifier. This can occur for several reasons such as the data is missing values that were used to train the classifier. One approach to address the missing values from the data to be analyzed is by providing a value for that data. This value can be based on an average value for the particular missing feature within the dataset that was observed in the training data. Alternatively, the missing values in the in the data can be replaced with a zero value. The problem with this approach to replacement of the values is that it modifies the original data that was to be classified in a way that may impact the validity of the final classification of the data. In contrast to these approaches the classifier is also configured redo its training model based on the data that is presented via the test data.

For various reasons, many real world datasets contain missing values. Such datasets however are incompatible with most classifiers. This is because most classifiers assume that all values in an array are numerical or catergorical, and that all have and hold meaning. Classifying instances with missing values results in performance degradation. This renders the resulting system unpredictable. One approach that has been used as a basic strategy when presented with an incomplete datasets is to discard entire rows and/or columns that contain missing values. However, this approach comes at the price of losing data which may be valuable despite not being complete. In the present approach a classifier can be trained for each case of M missing features out of the total available N features. This is achieved by training a classifier on the remaining subset of features. In situations where the training data also has missing values, the training could be continued on just a subset of training examples for which all the members of the remaining feature subset exists. Notice that this subset is larger than just taking examples which are exactly the same as in the test with respect to the missing features. However, this may be implausible due to the combinatory expansion of the number of possible classifiers C by the binomial factor $$\binom{N}{M}.$$

For example, in the case where N=100 and M=10 then C□1.7·10$^{13}$. This amount of possible missing feature sets is impractical to keep in the memory of most current computer system. Therefore, it becomes impracticable and almost impossible to train a classifier for each case in advance. Further, some instances of missing features set may be very rare. Therefore, keeping a classifier for every possible missing feature set is inefficient and impracticable. The situation is made even worse when the number of missing features is also a random variable.

Figure 4:
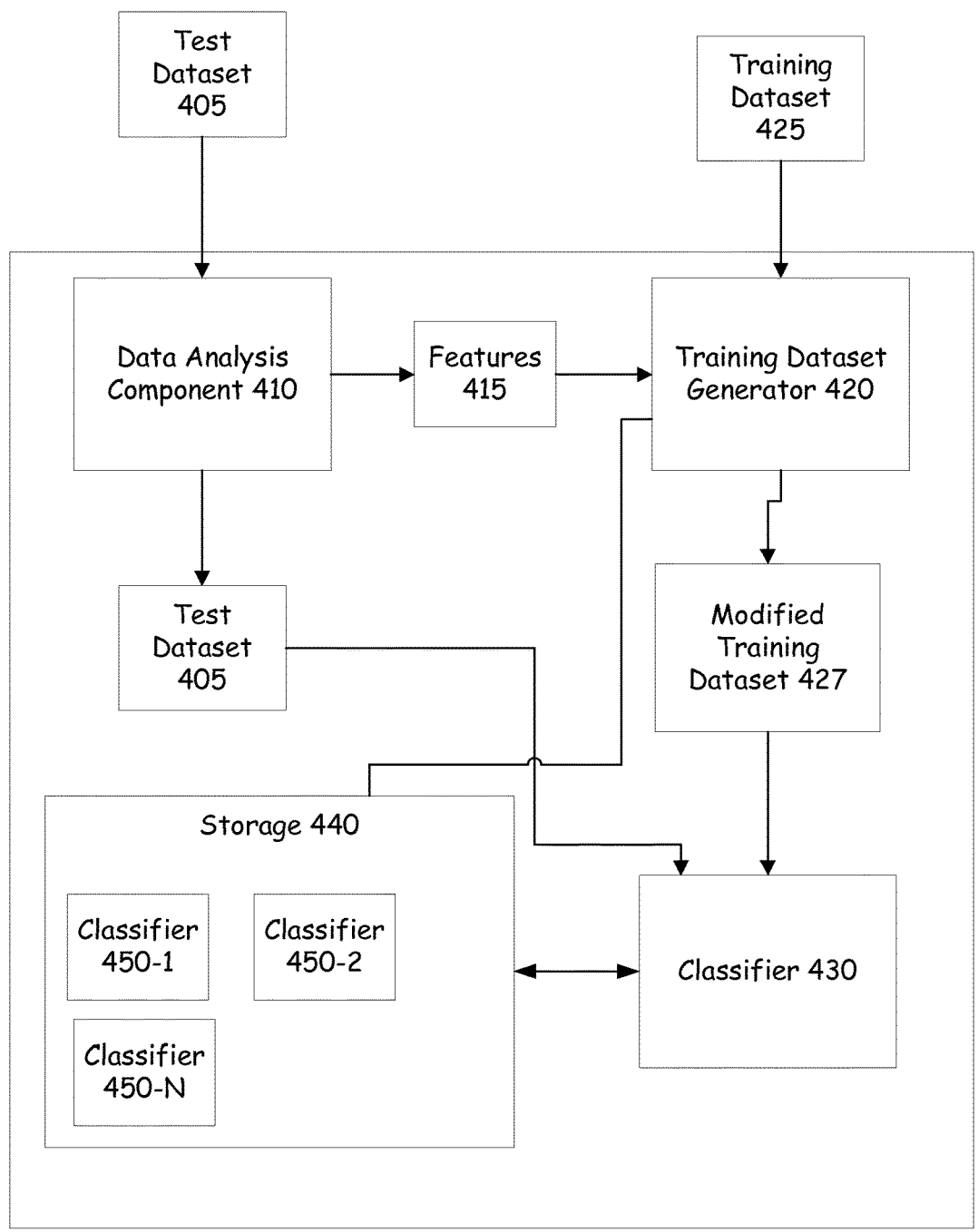
FIG. 4 is a block diagram of a system for providing just in time training or calibration of a classifier according to one illustrative embodiment.

FIG. 4 is a block diagram illustrating a system 400 for training or calibrating the classifier 430 based on the incoming data to be classified. System 400 includes a data analysis component 410, a training dataset generator 420, and a classifier 430.

Data analysis component 410 is a component of the system 400 that is configured to analyze an incoming test data that is to be classified and determine what features are present in the test data. The data analysis component 410 can use any process available to identify the features that are present in the test data. Specifically the test data may have less features in it than the data that was used to train the classifier 430. One reason the test data may have less features is that the information was simply not provided when the test data was created or input. For example, when filling out a patient information form the patient or doctor failed to enter in certain data about the patient that can be used by the classifier 430 to classify the patient. Other reasons the particular features may be missing from the test data can come from the test data having been filtered by another source for another reason and not reinstated. However, regardless of the reason the data analysis component 410 identifies the features 415 that are present in the test data. This information is passed the training dataset generator 420.

Training dataset generator 420 is a component of the system 400 that identifies the features from the training data that are needed to build and calibrate a classifier 430 specific to the incoming test dataset 405. The training dataset generator 420 receives from the data analysis component 410 the information related to what features were found to be in the test data and in some approaches what features were found to be missing from the test data. The training dataset generator 420 based on the features present in the test data builds a new training dataset 425 for the test data based on the features that are present in the test data. The training dataset generator 420 takes each entry in the training data and removes from that entry the features that are not present in the test data. In some approaches the training data may be missing values for the particular features that are present in the test data. When this situation occurs the training set generator can perform an analysis on the particular entry to determine if the entry should be kept or not. In one approach the training dataset generator 420 uses information about whether the missing feature is an informative features such as the informative features discussed above with respect to FIGS. 1-3. If the feature that is missing in the training data is determined to be an informative feature the training set generator can either remove the corresponding entry from the training data (for this particular instance) or can provide a token or substitute value for the feature so that the entry can be used for the training data. In some approaches the training dataset generator 420 determines if the test data is missing an informative feature. Again the informative features may be the features that were identified above with respect to FIGS. 1-3. If the test data is missing one or more informative features the training dataset generator 420 can perform several actions. In one approach the training dataset generator 420 can generate a message that can be returned to the originator of the test data indicating that the test data is incomplete and that a specific feature or features in the data need be provided. This approach can help ensure that the classifier 430 doesn't produce a poor or incorrect result. Alternatively, the training set generator can modify the test data by adding in the informative feature that is missing with an average value for that feature. The output of the training dataset generator 420 is a modified version of the training data that has been tuned specifically for the incoming test data. The output of the training can also include a performance estimation of the current model (e.g. via cross validation) together with the predicted output. This way, the consumer of the prediction can also have an estimate of the correctness of the prediction.

The classifier 430 is a component of the system 400 that is configured to classify a dataset according to a set of rules. The set of rules that are used by the classifier 430 are designed to look at the test dataset 405 that is input and each feature of the test data and determine a particular output based on the combination of the features of the dataset. For example, the classifier 430 may be configured to determine if a transaction is a fraudulent transaction. In this instance each of the features that appear in the dataset provide information to the classifier 430 as to if the transaction is or is not fraudulent. The classifier 430 is trained using training data that has features in the training data that should result in a particular result from the classifier 430. The larger the training dataset 425 is that is processed through the classifier 430 the more the classifier 430 is able to tune or modify the rules that are used to generate a particular output. The classifier 430 can use any rules or processes available to classify or otherwise produce the output from the input data. The classifier 430 is calibrated using the modified version of the training data that was generated by the training dataset generator 420. In this way the classifier 430 is calibrated using test data that most closely matches the incoming test data. The calibrated classifier 430 is then used to process the test data to classify the test data. The output of the classifier 430 is the determined result based on the specific calibrated classifier 430 for the test data.

The calibrated classifier 430 can in some embodiments be stored in a database of calibrated classifiers 450-1, 450-2, 450-N (collectively 450), or can be stored in a storage or memory for retrieval. These calibrated classifiers 450 are classifiers that were previously generated from other training data based on other test data inputs. The stored classifiers 450 can improve the response time of the system 400 as the calibration of the particular classifier 450 does not need to be repeated. Specifically, prior to calibrating the classifier 430 with the modified training data and creation of the modified training dataset 427 the training dataset generator 420 can search the stored classifiers to see if there is a classifier 450 that matches the features in the test data. If there is a match in the stored classifiers 450, the training dataset generator 420 can cause the stored classifier 450 to be loaded as the classifier 430 without further analysis or processing to be performed. In some embodiments only a limited number of classifiers are stored. In this approach the stored classifiers 450 are the most recent classifiers used by the system 400. The system 400 may only store, for example, the previous 3 or 5 classifiers in memory. However, any number of classifiers may be retained. As a new classifier 430 is calibrated the oldest (in terms of when it was last accessed) classifier 450 stored may be removed from the list of classifiers. However in other approaches the system 400 may remove the classifier 450 from the list that is the least popular. That is the classifier 450 that is used less frequently will be removed. In this way a popular classifier 450 is not removed simply because a number of different test datasets came through. The caching approach discussed above can in some embodiments be an approximated approach in situations or scenarios where the total number of missing value combinations is too large to keep an exact count of each past combination appearances.

Figure 5:
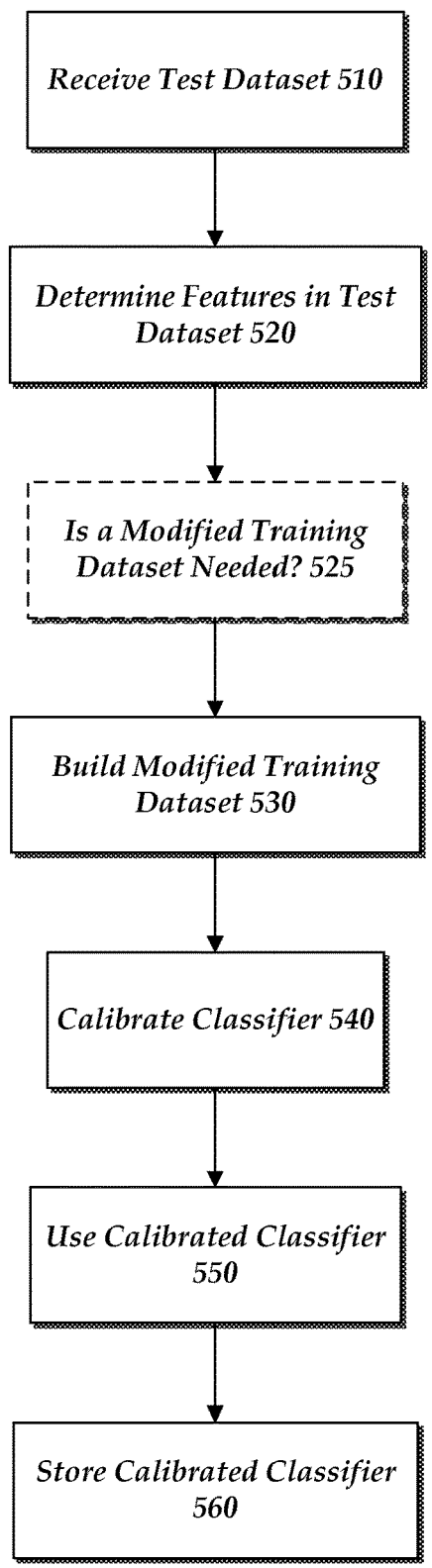
FIG. 5 is a flow diagram of a process for providing just in time calibration of a classifier according to one illustrative embodiment.

FIG. 5 is a flow diagram illustrating a process for calibrating a classifier 430 for a specific test dataset 405 when the test dataset 405 is presented. The process begins with the receipt of the test dataset 405. The test dataset 405 can be any dataset that a user or application desires to have classified according to a set of classification rules based on the information or features presented in the test dataset 405. This is illustrated at step 510. The test dataset 405 can originate from any source and may have a number of features. For example in a medical setting the test dataset 405 can include a number of features related to the person's gender, height, age, weight, blood pressure, etc. In a fraud detection setting, the features can include things such as card use, transaction amount, home address, location of charge, type of merchant, etc. Again the test dataset 405 can be any type of data that a user wishes to have classified.

The test dataset 405 is analyzed to determine what features are present in test dataset 405. This is illustrated at step 520. In some embodiments the data analysis component 410 can also determine what features of the test dataset 405 are missing. Any method for identifying the features that are present in the test dataset 405 may be used. The features of the test dataset 405 that are present are identified and then provided to the training dataset generator 420.

The training dataset generator 420 receives from the data analysis component 410 the features that are present in the test data that is to be run through the classifier 430. The training set generator takes the features from the test dataset 405 and builds a training dataset 425 specifically for the test dataset 405. This is illustrated at step 530. The training dataset generator 420 determines which features are present in the test dataset 405 and for each entry in the training set removes from that entry all of the features that are not present in the test dataset 405. For example, if the test dataset 405 has 10 features and an entry in the training data has 25 features the entry would be compressed down to the 10 features that are present in the test dataset. The remaining 15 features would be disregarded in building the modified training data. If the missing features are informative for prediction, dummy features which represent whether a feature is missing or not could be appended to the training and testing set so that the classifier is able use the knowledge that the feature is missing in the attempt to predict correctly.

In some instances an entry in the training data may be missing a feature that is present in the test dataset 405. This feature may be missing from the training data for a variety of reasons. The training dataset generator 420 can handle this missing value in a number of ways. In one approach the training dataset generator 420 can remove the entry from the training dataset 425. This approach can be useful in ensuring that the only the strongest entries in the training data are used for the calibration of the classifier 430 as the modified training data. Alternatively the training dataset generator 420 can modify the training data to fill in this missing feature from the entry by inserting a value for this feature into the entry. Or the training dataset generator 420 can simply not do anything with the entry and allow it to be used with the missing value missing. In making the determination as to whether or not to keep an entry the training dataset generator 420 can in some embodiments consider if the feature that is missing is an informative feature as discussed above. If the feature is an informative feature the training dataset generator 420 will remove the entry from the modified training dataset 427 because the missing value is more likely to cause poor training results than if the entry were left in the system 400. This approach can also be used for the insertion of a value into the entry. That is if the value is an informative feature, then the desire to have a value for that feature is important and the insertion of, for example, an average value for the feature will be necessary if the entry is to remain. In some embodiments a dummy Boolean value can be added to the feature vector if the feature is an informative for the prediction and is found to be missing.

In building the modified training dataset 427 the training dataset generator 420 also can consider if the test dataset 405 is missing a key informative feature or not. As discussed above with respect to FIGS. 1-3 an informative feature(s) can be identified. If the test dataset 405 is missing an informative feature the training dataset generator 420 does not necessarily need to train the classifier 430. In one approach if the missing feature is an informative feature the training dataset generator 420 causes a message or other indication to be sent back to the originator of the test dataset 405 informing them of the error in their data. The originator can in some embodiments send a reply message informing the system 400 to continue on with the test dataset 405. In the absence of the direct instruction otherwise the training dataset generator 420 does not generate a modified training dataset 427 for the test data. In an alternative embodiment the training set generator proceeds to generate the modified training dataset 427 but places a note or otherwise indicates that the test data was missing an informative feature and therefore the results that are produced are not necessarily accurate or correct.

Additionally, in some embodiments previous versions of the calibrated classifiers have been stored for retrieval by the system 400 and use as the classifier 430 instead of retraining the classifier 430 again from the beginning. In this embodiment prior to building the modified training dataset 427 the training dataset generator 420 checks to store that holds the calibrated classifiers 450-1, 450-2, 450-N (collectively 450) and determines if there is an already existing classifier 450 for the features of the test dataset 405. If there is an existing classifier 450 then the training dataset generator 420 simply causes that classifier 450 to be loaded into the system 400 for use with the test dataset 405. In some embodiments the test data generator may consider a particular classifier 450 in the store a match even though it isn't a direct match. For example if a classifier 450-1 in the store has all of the features of the test dataset 405 plus a set number of extra features (below a threshold number) that classifier 450 can still be selected. However, if the classifier 450 has fewer features or too many features (above the threshold number) the classifier 450 will not be selected by the training dataset generator 420 as the classifier 450.

The decision to build or not build the modified training dataset 427 is illustrated by optional block 525.

Once the modified training dataset 427 is built by the training set generator the classifier 430 is calibrated. This is illustrated at step 540. The process of calibrating the classifier 430 can be done by any method or process available. However, the training is done using the modified training dataset 427 and not another dataset. Once the classifier 430 has been calibrated using the modified training dataset 427, the classifier 430 can then process the test data and render a classification. This is illustrated at step 550. Again the process that is used for classifying the test dataset 405 can be any process available so long as the classifier 430 has been classified according to the modified training dataset 427.

Following the creation of the calibrated classifier 430, the calibrated classifier 430 may be stored for later retrieval by the system 400 without the need to repeat the process of step 530. This is illustrated by step 560. In some embodiments each classifier 430 that is created is stored. In other embodiments only a set number of classifiers are retained in memory. In these embodiments a new classifier 430 that is created replaces an already existing classifier 430. The system 400 can determine which calibrated classifier 430 to replace with the new classifier 430. In one approach the system 400 replaces the classifiers on a first in first out approach. In another approach the system 400 considers how often a particular classifier 430 is used. In this approach the least used classifier 430 is removed and replaced with the new classifier 430. In some approaches a combination of the FIFO approach and the use approach is used. The system can also determine to use an approximate previous trained classifier which does not exactly fit the current test vector but it closer than others. In this approach the system may consider the distance that the previous trained classifier is from the current test vector. If it is within a predetermined distance that classifier can be selected.

In summary the present disclosure is directed to a method for training a classifier. The method begins by receiving a test dataset and analyzing the test dataset to determine a plurality of features present in the test dataset. Next a modified training dataset from a training dataset is generated based upon the determined plurality of features. The modification may include removing from the training data set features that are not present in the test data set. Then the classifier is calibrated or trained using the modified training dataset.

The present disclosure is also directed to a system for training a data classifier. The system includes a data analysis component configured to determine a first plurality of features present in a test data, and a training dataset, the training dataset having a plurality of entries, each of the plurality of entries having a second plurality of features wherein the first plurality of features are a component of the second plurality of features. The system further includes a training dataset generator configured to generate a modified training dataset from the training dataset wherein the modified training dataset reduces the second plurality of features to the only the first plurality of features, and a classifier configured to classify the test data based on the classifier being calibrated using the modified training set and not the training dataset.

The invention claimed is:

1. A computing system for training a data classifier, the computing system comprising:
   a processor;
   memory;
   a data analysis component stored in the memory and executable by the processor to receive a first test data and a second test data and determine a first plurality of features present in the first test data and a second plurality of features present in the second test data;
   a training dataset stored in the memory, the training dataset having a plurality of entries, each of the plurality of entries having a third plurality of features wherein each of the first plurality of features and the second plurality of features are a component of the third plurality of features;
   a training dataset generator stored in the memory and executable by the processor to generate a first modified training dataset from the training dataset by removing one or more features that are not present in the first test data from the third plurality of features to reduce the third plurality of features to only the first plurality of features, and generate a second modified training dataset from the training dataset by removing one or more features that are not present in the second test data from the third plurality of features to reduce the third plurality of features to only the second plurality of features; and
   a machine learning classifier stored in memory and executable by the processor to classify the first test data and the second test data, wherein the processor is configured to calibrate the machine learning classifier via a training process using the first modified training dataset to classify the first test data, and to calibrate the machine learning classifier using the second modified training dataset to classify the second test data.

2. The system of claim 1 wherein the training dataset generator is further configured to remove from the modified training dataset an entry when that entry has a missing feature from the first plurality of features.

3. The system of claim 1 wherein the training dataset generator is further configured to remove from the modified training dataset an entry when that entry has a missing feature from the first plurality of features that is determined to be an informative feature.

4. The system of claim 1 wherein the training dataset generator is further configured to not generate a modified training dataset when one feature of the third plurality of features not in the first plurality of features is determined to be an informative feature.

5. The system of claim 4 wherein the training dataset generator is configured to send a message back to an originator of the first test data an indication that the first test data is missing the informative feature and will not be further processed.

6. The system of claim 4 wherein the training dataset generator is configured to modify the first test data by adding a value to the first test data for the one feature missing from the first test data.

7. The system of claim 1 further comprising:
   a calibrated classifier store, the calibrated classifier store storing at least one calibrated classifier that was previously generated using a third modified training dataset, the third modified training dataset different from the first modified training dataset and the second modified training dataset.

8. The system of claim 7 wherein the training dataset generator is further configured to, prior to generating the first modified training dataset, determine if the at least one calibrated classifier in the calibrated classifier store was generated based upon the first plurality of features and to cause the at least one calibrated classifier to be used as the classifier.

9. The system of claim 7 wherein the calibrated classifier store is configured to add the classifier to the calibrated classifier store following calibration using the first modified training dataset.

10. A computer-implemented method for training a machine learning classifier, the method comprising:
    receiving, via at least one processor, a first test data and a second test data;
    analyzing, via the at least one processor, the first test data and the second test data to determine a first plurality of features present in the first test data and a second plurality of features present in the second test data;
    generating, via the at least one processor, a first modified training dataset from a training dataset based upon the determined first plurality of features by removing one or more features that are not present in the first test data from the first training dataset;
    generating, via the at least one processor, a second modified training dataset from the training dataset based upon the determined second plurality of features by removing one or more features that are not present in the second test data from the second training dataset; and
    calibrating, via the at least one processor, the machine learning classifier via a training process using the first modified training dataset to classify the first test data, and calibrating the machine learning classifier using the second modified training dataset to classify the second test data.

11. The method of claim 10 further comprising:
classifying the first test dataset using the calibrated classifier.

12. The method of claim 10 wherein generating the first modified training dataset further comprises for each entry of a plurality of entries in the training dataset:
removing from a third plurality of features in the training dataset those features which are not in common with the determined first plurality of features.

13. The method of claim 10 wherein generating the first modified training dataset further comprises for each entry of a plurality of entries in the training dataset:
removing from the training dataset entries from the plurality of entries that have at least one missing value for features in the determined plurality of features.

14. The method of claim 13 wherein removing the entry occurs when the at least one missing value is determined to be associated with an informative feature.

15. The method of claim 10 further comprising:
storing the calibrated classifier in a calibrated classifier store.

16. The method of claim 15 wherein storing the calibrated classifier further comprises, removing a previously stored calibrated classifier from the calibrated classifier store.

17. The method of claim 10 wherein prior to generating the first modified training dataset, the method further comprises:
determining if a previously generated calibrated classifier exists for the determined first plurality of features; and
inserting the previously generated calibrated classifier as the classifier when it is determined the previously generated calibrated classifier matches the determined first plurality of features.

18. The method of claim 10 wherein prior to generating the first modified training dataset, the method further comprises:
determining if the first test data has a missing feature that is an informative feature; and
not performing the steps of generating and calibrating when the first test data has a missing informative feature.

19. The method of claim 18 further comprising:
sending a message to an originator of the first test data indicating that the first test data is missing an informative feature.

* * * * *